United States Patent Office 2,897,039
Patented July 28, 1959

2,897,039

INTERMEDIATES FOR THE PRODUCTION OF COBALT PHTHALOCYANINES

Fritz Baumann, Leverkusen-Bayerwerk, and Berthold Bienert, Heinrich Vollmann, and Georg Rösch, Leverkusen-Wiesdorf, Germany, assignor to Farbenfabriken Bayer Aktiengesellschaft, Leverkusen, Germany, a corporation of Germany No Drawing. Application October 6, 1953
Serial No. 384,504

Claims priority, application Germany October 11, 1952

16 Claims. (Cl. 8—1)

This invention relates to intermediates which are useful in the production of cobalt phthalocyanines; it further relates to a process of producing these intermediates and cobalt phthalocyanines.

In copending application Ser. No. 254,186, filed on October 31, 1951, by Fritz Baumann and Berthold Bienert, now U.S. Patent No. 2,768,867, there is described a process of producing new cobalt complex compounds which show a red-orange to brownish-yellow coloration and can easily be converted into cobalt phthalocyanine by the reaction with reducing agents, partly already at room temperature.

According to a preferred embodiment this process is carried out in the presence of ammonium nitrate as oxidation agent.

Cobalt complex compounds with substantially equal properties are also described in German Patent No. 914,250. As set forth in this patent the cobalt complex compounds can be obtained from cobalt phthalocyanine by reaction with oxidation agents such as nitric acid (Example 27), or from cobalt phthalocyanine and 1-amino-3-imino-isoindolenine-nitrate (Example 32): furthermore, these compounds are obtainable by heating 1-amino-3-iminoisoindolenine with 1-amino-3-imino-isoindolenine-nitrate and cobalt chloride (Example 30). In Example 31 of this patent it is described that a yellow cobalt complex containing four isoindolenine radicals per one cobalt atom can be converted into another cobalt complex, which contains 40 carbon atoms per 1 cobalt atom (i.e. five 3-iminoisoindolenine radicals in the complex), by reaction with 1-amino-3-imino-isoindolenine.

The mode of origin of these cobalt complexes, their chemical and physical properties, especially the smooth conversion into cobalt phthalocyanine, as well as the results of a large number of analyses of the various modifications of these complexes are best understood if these cobalt complexes are supposed to have a common principle of construction. Probably they are complexes containing cobalt, which have the coordination No. 6; the structure of these complexes is similar to the phthalocyanine ring, they are hereinafter called phthalocyano cobalt complexes.

Copending application Ser. No. 254,186 also describes the use of cobalt complexes, which are soluble in alkaline agents, for dyeing and printing textiles.

In accordance with the invention we have found that new complex cobalt compounds capable of being converted into cobalt phthalocyanine are obtained by heating together a cobalt salt, a compound selected from the group consisting of urea and biuret, a compound having the formula $C_6H_4 \cdot (COONH_4)_2$ minus $xH_2O$, minus $yNH_3$, if desired in the presence of ammonium nitrate, and a catalyst for the reaction, said formula being such that $x$ is an integer varying from 0 through 3, $y$ is an integer varying from 0 through 2, both while $x+y$ is not more than 3, stopping the heating when a yellow to brown red solid is formed and reacting the thus obtained cobalt complex with aliphatic polyamines. The reaction may be carried out in the presence of an organic solvent such as nitrobenzene, dichloro benzene, and trichloro benzene.

As aliphatic polyamines may be used ethylenediamine, diethylenetriamine, hexamethylenediamine, $\gamma,\gamma'$-diaminopropyl-methylamine, 1-amino-3-dimethylaminopropane, 1-diethyleneamino-4-amino-n-pentane, and $\gamma,\gamma'$-diaminodipropylether etc.

As compounds of the formula $C_6H_4(COONH_4)_2$ minus $xH_2O$, minus $yNH_3$, wherein $x$ is an integer varying from 0 through 3, $y$ is an integer varying from 0 through 2, both while $x+y$ is not more than 3, the following compounds may be used; phthalic acid and their ammonium salts, phthalic acid anhydride, phthalimide, phthalic acid diamide, o-cyano-benzamide, phthalonitrile etc.

Suitable cobalt salts are for instance cobalt chloride, cobalt nitrate, cobalt sulfate, and cobalt acetate.

The reaction can be carried out by stirring or heating, preferably in a suspension of the complex cobalt compounds in methanol, acetone etc., with the above mentioned polyamines, if necessary, in the presence of alkalies.

The new complex cobalt compounds obtainable according to this invention are easily soluble in dilute aqueous acids and very suitable in the production of cobalt phthalocyanine.

The complex compounds applied to the fiber or to another substratum from weakly acid solution easily yield deep blue colored dyeings or prints of excellent fastness to washing and light by reaction with reducing agents and partly by heating.

These basic complex cobalt compounds show the advantage over the above mentioned sodium compounds (i.e. those of application Ser. No. 254,186) that they are capable of producing stable solutions which are also suitable for slop dyeing fibrous materials. Furthermore, the fixation of the dyestuffs cannot only be accomplished by treatment with neutral vapors but also with acid vapors.

The invention is further illustrated by the following examples, the parts being by weight.

*Example 1*

1 part of a cobalt complex prepared according to Example 1 of copending application Ser. No. 254,186 (due to its molecular weight (about 752) and the properties, the complex is believed to consist of 1 mol of cobalt phthalocyanine, 1 mol of 1-amino-3-iminoisoindolenine and 1 atom of Cl or 1 mol of HCl) are heated with 6 parts of methanol and 1 part of ethylenediamine to boiling with stirring for 10–20 minutes until a sample is easily soluble in dilute acetic acid. After cooling the reaction product is filtered with suction, washed with methanol and water and dried. A brownish orange-yellow colored, well crystallized substance is obtained, which easily dissolves in dilute acetic acid, shows a certain affinity for vegetable, animal and synthetic fibers and rapidly yields cobalt phthalocyanine upon addition of reducing agents, for instance sodium hyposulfite.

*Example 2*

Into a mixture of 2 parts of an aliphatic polyamine and 0.6 part of methanol, 1 part of the cobalt complex employed in Example 1 as starting product is introduced with stirring at 10–15° C. and the mixture is stirred at this temperature for about 15–30 minutes. 5 parts of methanol are slowly added, the mixture is stirred for another 15–30 minutes, the reaction product filtered with suction and further treated as described in Example 1.

The yellow, reddish-orange brown colored reaction products of the complex cobalt compounds are mostly obtained with the polyamines in almost quantitative yields. As polyamines may be used for instance ethylenediamine, diethylenetriamine, hexamethylenediamine, γ,γ'-diaminopropylmethylamine, 1 - amino - 3 - dimethylaminopropane, 1 - diethyleneamino - 4 - amino - n - pentane, and γ,γ'-diaminodipropylether. All these polyamines yield reaction products which easily dissolve in dilute, organic acids and may be employed for producing dyeings or prints.

The development and fixation of the dyestuffs on the fiber is promoted if the production of slop padding solutions or printing pastes is carried out in the presence of reducing agents and solvents.

*Example 3*

2 parts of a basic, complex cobalt compound according to Example 1 or 2 are stirred with 10 parts of a solvent mixture containing 428 parts of formamide,
100 parts of thiodiglycol,
115 parts of diglycol,
72 parts of glycerine and
285 parts of glycolmonomethylether in 1000 parts 5 parts of glacial acetic acid or formic acid are added and the mixture is filled up with water to 100 parts.

The solution is employed for dyeing cotton, viscose rayon, silk or staple rayon. The dyed material is treated with neutral or acid steam after a short intermediate drying at 40–70° C. or heated to 100–150° C. for a short time. The development of the dyeing is completed by heating with dilute formic acid containing sodium bisulfite (20 grams of formic acid and 1–5 grams of sodium bisulfite solution of 40° Bé. per liter) to about 90° C. for about 5–10 minutes, rinsing and saponifying. Especially fine dyeings are obtained by treating the material with dilute sodium hydroxide solution and glucose (1–2 grams per liter) for a short time before or during saponification.

In similar manner stable printing pastes are made by addition of thickeners usually employed in textile printing. In many cases, for instance in printing cotton or silk, organic solvents may be dispensed with; in this case it may be of advantage to employ mixtures of formic acid and acetic acid or other acids. Additives which yield improved prints, especially in the printing of staple rayon or viscose rayon, in addition to urea and thiourea and derivatives thereof, are, inter alia, carboxylic acid halides and their functional derivatives, aldehydes for instance para-formaldehyde, para-acetaldehyde, chloral hydrate, benzaldehyde or furfurol, aromatic hydroxy compounds, particularly hydroquinone, resorcinol or catechol, furthermore ketones, lactams, lactons and like compounds, for instance caprolactam, γ-butyrolactons, pyrrolidone or mixtures thereof.

By this process full dyeings and prints of cobalt phthalocyanines can be produced on the fiber, which are distinguished by a beautiful clear shade and excellent fastness properties.

*Example 4*

1 part of a phthalocyano cobalt complex (its production is described below) is stirred with 5 parts of pure acetic acid (containing no reducing contaminations) and the solution, which is clear and dark orange colored upon weakly heating, is shortly heated to the boil. A slightly soluble cobalt complex containing acetic acid in a combined state precipitates. This complex, which is insoluble in glacial acetic acid, is stirred with 8 parts of methanol, and sodium hydroxide solution (35–40%) are added in drops at room temperature until a clear orange-brown colored solution forms. The solution is then mixed with 0.5 part of ethylenediamine and heated to the boil. The basic complex precipitating in light reddish-brown needles is filtered with suction, washed with methanol and dried at 80° C. The yield is about 1 part. The product obtained dissolves in cold acetic acid (5%) with a clear yellow coloration and dyes cotton yellow shades. By immersing the dyed material after squeezing in an aqueous hydrosulfite solution, which is rendered alkaline by sodium carbonate, a dark blue dyeing of cobalt phthalocyanine is immediately produced. Wool and silk can be dyed in the same manner.

The cobalt complex employed as starting material is obtained by the following process (described in copending application Ser. No. 254,186): 148 parts of phthalic anhydride, 240 parts of urea, 40 parts of ammonium nitrate, 32.5 parts of anhydrous cobalt chloride and 0.3 part of ammonium molybdate are stirred in 200 cc. of nitrobenzene at 170–180° C. for 5–6 hours, the mixture is then cooled to a temperature below 50° C., diluted with methanol and filtered with suction. After washing with methanol and drying a mixture is obtained, which contains about 25% of cobalt phthalocyanine and 75% of a phthalocyano cobalt complex which is easily soluble in glacial acetic acid. The complex can be separated in a very simple manner by stirring the mixture with glacial acetic acid at 30–40° C. After filtering pure cobalt phthalocyanine is obtained as residue whereas the above described slightly soluble "acetate" complex is precipitated from the yellow orange colored glacial acetic acid solution by heating to 80–110° C.

The separation of cobalt phthalocyanine and the yellow complex may also be performed quantitatively by extraction witht methylene chloride in the Soxhlet apparatus. The extraction is complete when the effluent is colorless. Cobalt phthalocyanine remains behind in the residue whereas the phthalocyano cobalt complex crystallizes from the methylene chloride solution partly in red-orange colored coarse rhombs, partly in another form which is easily soluble in methylene chloride. In either case the slightly soluble acetate complex is obtained by heating with glacial acetic acid; this acetate complex dissolves in methanol upon addition of sodium hydroxide solution and easily reacts with polyamines.

The phthalocyano cobalt complex, which is easily soluble in glacial acetic acid, does not dissolve in methanol upon addition of sodium hydroxide solution and scarcely reacts with ethylene diamine. According to analysis its decomposition corresponds to the summation of 1 mol of cobalt phthalocyanine, 1 mol of 1-amino-3-iminiisoindolenine, 1 mol of ammonia and 1 mol of water; it is free from halogen.

*Example 5*

1 part of the light brownish-orange colored cobalt complex, which is slightly soluble in nitrobenzene and has been prepared according to German Patent No. 914,250 (Example 32) from cobalt phthalocyanine by heating with about 2 mols of 1-amino-3-iminoisoindolenine nitrate, is heated in 10 parts of methanol with 1 part of ethylenediamine and some sodium hydroxide solution (40%) to 50° C. The reactants dissolve quickly with a dark yellow-brown coloration. By heating the solution to the boil a light brownish-orange yellow colored, crystallized, basic complex precipitates within a few minutes. After filtering with suction, washing with methanol (wherein the complex is substantally insoluble) and drying about 1.05 parts of the reaction product are obtained. The product gives a clear and yellow solution in cold acetic acid (5%). Cobalt phthalocyanine precipitates almost quantitatively from the solution upon addition of strong reducing agents, for instance hydrosulfite, already at room temperature, and upon addition of weak reducing agents, for instance sulfite, upon slightly heating. The analytical composition of the product approximately corresponds to the empirical formula $C_{45}H_{35}N_{13}O_2CO$ with a molecular weight of about 812.

*Example 6*

By treating 1 part of the cobalt complex prepared according to German Patent No. 914,250, Example 30, from 1-amino-3-iminoisoindolenine, 1-amino-3-iminoisoindolenine-nitrate and cobalt chloride in nitrobenzene at 180° C. in methanol in the presence of some sodium hydroxide solution, as described in the preceding example, with ethylene diamine a basic cobalt complex, which is easily soluble in 5% aqueous acetic acid or formic acid, is obtained in good yield. This complex shows the same properties as the complex described in the preceding example.

*Example 7*

A phthalocyano cobalt complex, which is easily soluble in acetic acid (5%), is prepared in one processing step as follows: a mixture of 5000 parts of phthalic anhydride, 6300 parts of urea, 1000 parts of cobalt chloride, 800 parts of ammonium nitrate and 10 parts of ammonium molybdate are heated to 178–182° C. in 10,000 parts of nitrobenzene while introducing a stream of air or nitrogen of 40,000–50,000 parts by volume per hour, stirring and refluxing until no dark cobalt phthalocyanine needles are visible any longer under the microscope. The heating procedure is carried out for totally about 12–16 hours. The final volume of the light orange-brown colored suspension is 8000–9000 parts by volume.

After cooling to 70° C. the suspension is diluted with 25,000 parts of methanol, cooled to 28° C. and 1200 parts by volume of sodium hydroxide solution (45%) are added, the temperature rising to 35° C. After stirring for a further 15–20 minutes 2000 parts by volume of ethylene diamine (73%) are added. The ethylene diamine complex precipitates in crystals from the initially clear brown colored solution upon heating to 55–60° C. Precipitation is complete within one hour. A filtered sample dissolves in acetic acid (5%). The mixture is filtered with suction at 30° C. and the filtrate is washed with methanol to remove the nitrobenzene, then with water and subsequently dried at 70–80° C. The yield amounts to 4700 parts.

The product is suitable for dyeing and printing textile materials from aqueous solutions, as is more fully described in the Examples 1–3.

*Example 8*

Ethylene diamine is reacted, as described in Example 1, with a phthalocyano cobalt complex prepared as follows: 148 parts of phthalic anhydride, 240 parts of urea, 40 parts of anhydrous cobalt-(II)-chloride and 12 parts of titanium tetrachloride are heated to 160° C. within one hour with stirring; stirring is continued at this temperature for another 3 hours. 25 parts of ammonium nitrate are added to the reaction mixture which is stirred for another 3 hours at 180° C., thereafter at 200–205° C. for 1½ hours until the examination of a sample under the microscope shows no dark colored needles of cobalt phthalocyanine. The mixture is now present as a brownish-yellow suspension, which after cooling to 90° C., is diluted with 700 parts by volume of methanol, filtered with suction at 30° C. and then washed with methanol. Small quantities of phthalimide can be removed by shortly stirring with aqueous sodium hydroxide solution (5%), filtering and washing with water. After drying at 90° C. about 130 parts of a light brownish-yellow colored, finely crystallized powder is obtained, which dissolves upon stirring with methanol and with the addition of sodium hydroxide solution (40%) with a dark yellow-brown coloration. The phthalocyano-ethylene-diamine complex crystallizing from this solution upon heating with ethylene diamine shows the same properties as the complex obtained according to Example 1; this proves the identity of the complexes. The analytical composition of the complex corresponds to the summation of 1 mol of cobalt phthalocyanine, 1 mol of 1-amino-3-iminoisoindolenine, 1 mol of ethylene diamine and 2 mols of $H_2O$ after drying at 100° C.

We claim:

1. The process of producing cobalt compounds capable of being converted into cobalt phthalocyanine which comprises reacting a cobalt complex with a member selected from the group consisting of lower alkyl polyamines and lower alkyl ether polyamines at room to water bath temperatures until a yellow to brownish red solid basic complex cobalt compound is formed and recovering the basic complex cobalt compound so formed, said cobalt complex used as the starting material being selected from the group consisting of (1) a yellow to brown-red colored compound obtained by heating at a temperature within the range of 150–230° C. and until the cobalt phthalocyanine, formed simultaneously with the yellow to brown-red colored compound, has disappeared, a cobalt salt, a compound selected from the group consisting of urea and biuret and a compound selected from the group consisting of phthalic acid anhydride, phthalic acid, phthalimide and phthalodinitrile, and a catalyst for the reaction selected from the group consisting of a molybdenum compound and titanium tetrachloride, (2) an orange colored complex cobalt compound obtained by reacting in an inert diluent at a temperature within the range of 200–210° C. cobalt phthalocyanine and 1-amino-3-imino-isoindolenine nitrate, and (3) an orange colored complex cobalt compound obtained by reacting within a temperature range of 160–205° C. 1-amino-3-imino isoindolenine, 1-amino-3-imino-isoindolenine nitrate and cobalt chloride.

2. The process of producing new complex cobalt compounds capable of being converted into cobalt phthalocyanine which comprises heating within a temperature range of 150–230° C., 1 mol of a cobalt salt, about 4–6 moles of a compound selected from the group consisting of phthalic acid anhydride, phthalic acid, phthalimide and phthalodinitrile, at least 4 mols of a compound selected from the group consisting of urea and biuret, as catalyst for the reaction a member selected from the group consisting of a molybdenum compound and titanium tetrachloride and in the presence of ammonium nitrate, stopping the heating when a yellow to brown red solid is formed, the simultaneously formed cobalt phthalocyanine has disappeared, recovering the reaction product and reacting the latter with about the same amount of a member selected from the group consisting of lower alkyl polyamines and lower alkyl ether polyamines at room to water bath temperature and recovering the basic complex cobalt compound formed.

3. The process as claimed in claim 2, wherein the reaction is carried out in an organic solvent.

4. The process as claimed in claim 2, wherein the polyamine is ethylenediamine.

5. The process as claimed in claim 2, wherein the polyamine is diethylenetriamine.

6. The process as claimed in claim 2, wherein the polyamine is γ,γ'-diaminopropyl-methylamine.

7. The compounds obtained according to the process claimed in claim 1.

8. The compounds obtained according to the process claimed in claim 4.

9. The compounds obtained according to the process claimed in claim 5.

10. The compounds obtained according to the process claimed in claim 6.

11. A composition of matter comprising a complex cobalt compound obtained by the process claimed in claim 1, a water soluble organic solvent therefore, water and a reducing agent.

12. A composition of matter comprising a complex cobalt compound obtained by the process claimed in claim 1, a water soluble organic solvent therefore, a dilute acid, water, a thickening agent and a reducing agent.

13. A process for decorating textiles which comprises treating said textiles with a composition of matter as claimed in claim 11 and developing the cobalt phthalocyanine by heating up to temperatures of about 150° C.

14. A process for decorating textiles which comprises treating said textiles with a composition of matter as claimed in claim 12 and developing the cobalt phthalocyanine by heating up to temperatures of about 150° C.

15. A process for decorating textiles which comprises treating said textiles with a composition of matter as claimed in claim 12 and developing the cobalt phthalocyanine by treatment with neutral vapors at temperatures of about 100 to 130° C.

16. A process for decorating textiles which comprises treating said textiles with a composition of matter as claimed in claim 12 and developing the cobalt phthalocyanine by treatment with acid vapors at temperatures of about 100 to 130° C.

References Cited in the file of this patent

UNITED STATES PATENTS

| | | |
|---|---|---|
| 2,124,419 | Keilbron et al. | July 19, 1938 |
| 2,216,868 | Wyler | Oct. 8, 1940 |
| 2,662,897 | Pedersen | Dec. 15, 1953 |
| 2,681,348 | Brooks | June 5, 1954 |
| 2,683,643 | Baumann et al. | July 13, 1954 |